United States Patent
Iyer et al.

(10) Patent No.: US 7,700,214 B1
(45) Date of Patent: Apr. 20, 2010

(54) METAL HYDRIDE FUEL CELL CARTRIDGE AND ELECTROLYZER ELECTRODE

(75) Inventors: Subramanian Iyer, Yorba Linda, CA (US); Vito A. Canuso, III, Villa Park, CA (US)

(73) Assignee: Quantumsphere, Inc., Santa Ana, CA (US)

( * ) Notice: Subject to any disclaimer, the term of this patent is extended or adjusted under 35 U.S.C. 154(b) by 0 days.

(21) Appl. No.: 12/624,864

(22) Filed: Nov. 24, 2009

Related U.S. Application Data (60) Provisional application No. 61/117,550, filed on Nov. 24, 2008.

(51) Int. Cl.
    *H01M 8/04* (2006.01)
    *H01M 8/02* (2006.01)
(52) U.S. Cl. .................. 429/34; 429/218.2; 429/40; 977/948
(58) Field of Classification Search .................. None
    See application file for complete search history.

(56) References Cited

U.S. PATENT DOCUMENTS

| | | | |
|---|---|---|---|
| 6,403,244 B2 * | 6/2002 | Faris et al. | 429/27 |
| 2005/0064266 A1 * | 3/2005 | Abdou et al. | 429/35 |
| 2007/0298301 A1 * | 12/2007 | Nakanishi | 429/31 |

* cited by examiner

*Primary Examiner*—John S Maples
(74) *Attorney, Agent, or Firm*—Knobbe Martens Olson & Bear, LLP (57) ABSTRACT

A cartridge comprises a housing that can be easily attached and detached from an electrolyzer so that the hydrogen generated can be stored within the cartridge. The housing is further configured to easily attach and detach from a fuel cell so that the stored hydrogen can be released to the fuel cell for power generation. In preferred embodiments, the cartridge comprises a cathode that serves to generate hydrogen when joined to the electrolyzer, as well as to store hydrogen. With this arrangement, a single device (the fuel cell cartridge) can function to generate hydrogen when connected to form part of the electrolyzer, to store hydrogen (whether attached to either the fuel cell or electrolyzer or neither—in stand alone form), and/or to supply hydrogen to the fuel cell, when connected thereto.

11 Claims, 7 Drawing Sheets

FIG. 7 US 7,700,214 B1

METAL HYDRIDE FUEL CELL CARTRIDGE AND ELECTROLYZER ELECTRODE

CROSS-REFERENCE TO RELATED APPLICATION

This application claims priority to U.S. Provisional Patent Application No. 61/117,550, filed Nov. 24, 2008, the contents of which is incorporated herein by reference.

BACKGROUND

1. Technical Field

This disclosure relates to the generation and storage of hydrogen fuel.

2. Related Art

Hydrogen is a renewable fuel that produces zero emissions when used in a fuel cell. In 2005, the Department of Energy (DoE) developed a new hydrogen cost goal and methodology, namely to achieve $2.00-3.00/gasoline U.S. gallon equivalent (gge, delivered, untaxed, by 2015), independent of the pathway used to produce and deliver hydrogen. The principal method to produce hydrogen is by stream reformation. Nearly 95% of the hydrogen currently being produced is made by steam reformation, where natural gas is reacted on metallic catalyst at high temperature and pressure. While this process has the lowest cost, four pounds of the greenhouse gasses carbon monoxide (CO) and carbon dioxide ($CO_2$) are produced for every one pound of hydrogen. Without further costly purification to remove CO and $CO_2$, the hydrogen fuel cell cannot operate efficiently.

Devices that are configured to electrochemically convert water into hydrogen and oxygen when energy is applied are generally known as water electrolyzers. Presently, about five percent of hydrogen production comes from water electrolysis. This reaction comprises the direct splitting of water molecules to produce hydrogen and oxygen. Importantly, greenhouse gasses are not produced in these reactions. In this process, electrodes comprising catalyst particles are submersed in water, and energy is applied to the electrodes. Using this energy, the electrodes split water molecules into hydrogen and oxygen. Hydrogen is produced at the cathode electrode, which accepts electrons, and oxygen is produced at the anode electrode, which liberates electrons. The amount of hydrogen and oxygen produced by an electrode is dictated by the current supplied to the electrodes. The efficiency depends upon the voltage between the two electrodes, and is proportional to the reciprocal of that voltage. In other words, the efficiency of the system increases as the voltage decreases. A more catalytic system will have a lower voltage for any one current, and therefore be more efficient in producing hydrogen and oxygen. If the catalyst is highly efficient, there will be minimal energy input to achieve a maximum hydrogen output. While this process is currently too expensive to compete with steam reformation due low efficiency and the use of expensive catalysts in the electrodes, emerging technologies show promise in balancing the economies.

For an electrolyzer to operate with high efficiency, the amount of product produced during reaction should be maximized relative to the amount of energy input. In many conventional devices, significant efficiency loss stems from low catalyst utilization in the electrodes, cell resistance, inefficient movement of electrolyte, and inefficient collection of reaction products from the electrolyte. In many cases, low efficiency is compensated for by operating the cell at a low rate (current). While this strategy increases efficiency, it also lowers the amount of products that can be produced at a given time.

The high-purity hydrogen produced in any of the above methods can be compressed and stored in either compressed gas cylinders, liquefied to liquid hydrogen, or adsorbed in solid state storage systems, such as metal hydride storage systems. The fuel is then accessible later for power generation. Solid state storage of hydrogen is widely viewed as a practical strategy for compact hydrogen storage. The principle is directly used in rechargeable batteries such as nickel-metal hydride (NiMH) batteries, in which hydrogen is reversibly absorbed into the anode electrode during battery cycling. Metal hydrides are also used as a source of hydrogen for supply of the said hydrogen to hydrogen fuel cells. These metal hydrides are inherently safe, and have good specific energy (~280 Wh/l) and energy density (~80 Wh/kg).

Hydrogen has been shown to be a tremendous fuel source for, amongst other energy (power) generators, fuel cells. A fuel cell is a device that converts chemical energy directly into electrical energy, via consumption of a fuel, such as hydrogen, an alcohol, or other hydrocarbons. The fuel cell comprises a negative terminal (anode), where the hydrogen fuel is consumed, and a positive terminal (cathode), where oxygen fuel is consumed. This energy generating device is highly advantageous in that fuel can be resupplied; the device will operate as long as anode and cathode are supplied with fuel. The anode fuel is oxidized on a catalyst surface to produce electrons and ions. Ions flow through an ion exchange membrane, and the electrons flow through an external circuit, generating electricity. Electrons and ions then recombine at the cathode catalyst surface with the cathode fuel. At the core of the fuel cell is the membrane-electrode assembly (MEA). The MEA comprises a membrane capable of exchanging ions such as $H^+$ or $OH^-$, a catalyst layer applied to each side of the membrane, and an electrically conductive backing on each catalyst layer. Reliable adhesion and interaction between these layers are some important factors for a fuel cell to operate at the highest power. To promote excellent catalyst utilization as well as electronic and ionic flow within the fuel cell, the composition and interfaces of the catalyst layer are some important factors to achieving low ohmic resistance and increased power output.

Electrodes for use in fuel cells and/or electrolyzers can comprise nano-metal particles, or a combination of nano- and micro-metal particles, that can be either be sintered as a monolithic structure, or applied as a layer (or embedded into) a supporting substrate structure, such as is described in Provisional Application Ser. No. 61/109,453, filed on Oct. 29, 2008, Provisional Application Ser. No. 61/046,790, filed on Apr. 21, 2008, U.S. application Ser. No. 11/868,152, filed on Oct. 5, 2007, U.S. application Ser. No. 12/114,719 filed on May 2, 2008, which has priority to Provisional Application No. 60/915,619, filed on May 2, 2007, U.S. application Ser. No. 12/053,484, filed on Mar. 21, 2008, which has priority to Provisional Application Ser. No. 60/896,722, filed on Mar. 23, 2007, U.S. application Ser. No. 11/781,909, filed on Jul. 27, 2007, which is a continuation-in-part of and has priority to U.S. application Ser. No. 11/394,456, filed on Mar. 31, 2005, U.S. Ser. No. 11/482,290, filed on Jul. 7, 2006, and U.S. Ser. No. 11/525,469, filed on Sep. 22, 2006, the entire contents of all of which are expressly incorporated herein by reference.

The composition of the metal nanoparticles can be a pure metal, an oxide of a metal, or an alloy of two or more metals. Preferably, the metal composition is selected from groups IIA, IB, and IIIB-VIIIB of the periodic table, most preferably nickel, manganese, aluminum, cobalt, copper, tin, palladium, silver, gold, lanthanum, and alloys thereof. Other metals have been shown to prove useful as a catalyst in an electrochemical context. The nano-metal particles can be made from one of a number of manufacturing process, such as the ones described in U.S. Pat. No. 7,282,167 to Carpenter issued on Oct. 16, 2007, and U.S. Ser. No. 11/591,787, filed on Nov. 2, 2006, the entire contents of both of which is hereby expressly incorporated by reference. In the '167 patent and '787 application, processes for making nano-metal particles more uniformly are described.

Portable power generation has increased significantly in demand as portable consumer electronics become personal assistants for most forms of entertainment and information. Powering these portable consumer electronics for long term use presents challenges, most of which are being addressed as part of battery technology. Batteries can comprise single use configurations or rechargeable configurations. While battery technology has proven to be quite successful, alternative sources of energy are also being considered. Indeed, technology has emerged that permits electrochemical systems to be scaled down to address desires of greater portability that eliminate the need for a traditional battery.

Others have suggested powering portable consumer electronics with a fuel cell supplied with a continual source of chemical energy to power the fuel cell. The fuel cell works in place of a battery by providing an efficient supply of electric power to the consumer electronic device. Like a battery, however, a supply of chemical energy is necessary. Therefore, a solution is desired to effectively provide a portable source of chemical energy to more easily and readily generate electric power for portable consumer electronics.

SUMMARY

In various embodiments, an electrochemical system is disclosed that is configured to generate hydrogen by, for example, water electrolysis wherein the catalyst comprises a material that is catalytic for hydrogen generation and/or is configured to store hydrogen for discharge to a fuel cell.

Relying in part upon technology developed at Quantumsphere, Inc. in Santa Ana, Calif., (see above), solutions are disclosed that effectively provide a portable source of chemical energy to more easily and readily generate electric power for portable consumer electronics. In one embodiment contemplated, a fuel cell cartridge comprises means for storing hydrogen that is produced in an electrolyzer, where the cartridge also functions as the anode for the electrolyzer. The storage means comprises, in one embodiment, metal hydride positioned within the cartridge.

Advantageously, the cartridge comprises a housing that can be easily attached and detached from the electrolyzer so that the hydrogen generated can be stored within the cartridge. The housing is further configured to easily attach and detach from a fuel cell so that the stored hydrogen can be released to the fuel cell for power generation. The cartridge housing can vary in configuration as necessary to accommodate fuel cells having particular dimension and form factors, as well as electrolyzers having particular dimension and form factors. Depending upon the uniformity of such form factors, adapters can be included to permit interchange of a single cartridge between fuel cells and electrolyzers having nonuniform configurations.

Each cartridge comprises a metal hydride electrode. In preferred embodiments, the metal hydride electrode comprises a cathode, whereby the cathode serves to generate hydrogen when joined to the electrolyzer and whereby the cathode serves to store hydrogen. Given the differing chemical environments present in an electrolyzer and in a fuel cell, the cartridge comprises membranes and fluid control for controlling the influx and expulsion of water to and from the cartridge so that the water does not interfere with the controlled flow of hydrogen in and out of the metal hydride structure. The system can comprise electronic controls, voltage and/or power regulators in a parallel circuitry. In preferred embodiments, oxygen is generated at the anode, while the atomic hydrogen produced at the metal hydride cathode is preferentially adsorbed into the lattice structure of the metal hydride.

With this arrangement, a single device (the fuel cell cartridge) can function to generate hydrogen when connected to form part of the electrolyzer, to store hydrogen (whether attached to either the fuel cell or electrolyzer or neither—in stand alone form), and/or to supply hydrogen to the fuel cell, when connected thereto. It is further contemplated that efficiency can be derived from providing a carousel arrangement of compartments for storing individual cartridges where charged cartridges can reside or can be moved to a charging station adjacent the carousel. For example, an arrangement of twelve compartments can be arranged in a generally circular configuration so that they can be moved to a charging station by rotating the carousel. One or more cartridges can be charged at a time, depending upon the number of adjacent charging stations provided. In one embodiment, the charging station comprises the portion of the electrolyzer to which the cartridge can be connected fluidly and electrically to electrolyze water. Other arrangements are contemplated, as described below and as covered by the claims.

DETAILED DESCRIPTION

At least some of the embodiments contemplated herein comprise a compact system for the generation and solid storage of hydrogen. Hydrogen stored in the solid state within a cartridge can be useful in a number of electrochemical applications, for example as the hydrogen supply to a fuel cell anode electrode. This is accomplished without the need for additional compression, cooling or heating steps as would be needed in a conventional hydrogen storage system in gaseous cylinders.

In a first aspect, a composition is provided that serves as both the cathode electrode in an alkaline water electrolyzer and a hydrogen storage material. During electrolysis, atomic hydrogen produced during the cathodic reaction is immediately absorbed and stored as a hydride, as reflected in the example of reaction below, where M=metal:

$$M_{(alloy)} + H_2O + e^- \rightarrow MH_x + OH^-$$

Preferably, the composition is a metal hydride, more preferably a mischmetal (Mm), and most preferably a multi-component alloy with a Ni or Ni alloy/oxide enriched surface coating. The metal hydride can be encapsulated in a cartridge system for easy installation or removal from the water electrolyzer system, and installation onto the anode area of a fuel cell for supply of hydrogen fuel to the fuel cell. It is contemplated that the metal or metal alloy would comprise nano-particles, either sintered together or coating (or embedded in) a support substrate. The nano-metal particles preferably comprise pure metal or an alloy of two or more metals selected from groups IIA, IB, and IIIB-VIIIB of the periodic table, most preferably nickel, manganese, aluminum, cobalt, copper, tin, palladium, silver, gold, lanthanum, and alloys thereof. The nano-metal particles can be made from one of a number of manufacturing process, such as the ones described in U.S. Pat. No. 7,282,167 to Carpenter, issued on Oct. 16, 2007, and/or those made by Quantumsphere, Inc. of California.

The fuel cell cartridge comprises an electrode that is configured to function effectively as the cathode of a water electrolysis system for generating hydrogen, where the electrode can be made as is described in one or more of the patent applications and patents identified above. In a preferred embodiment, a system useful as a compact device to provide hydrogen fuel to a fuel cell is contemplated, where the cathode electrode comprises a metal hydride hydrogen storage cartridge that can be removed from the system, or remain within the cartridge, and docked to the anode of a fuel cell, and then docked back to the system and refueled when the cartridge is depleted of hydrogen. In one embodiment, the system comprises a water supply container, and alkaline electrolyzer with cathode-metal hydride docking system, and related electronics and controls such that the system can sense and control water levels, hydrogen content, temperature, and pressure.

The cartridge comprises a housing that sealably houses a metal hydride cathode that can be placed in fluid communication interchangeably with both an electrolyzer and a fuel cell. The housing comprises at least two one coupling configured to relatively quickly connect and disconnect the housing from a corresponding electrolyzer and fuel cell. The coupling is configured to permit the controlled flow therethrough of either water, hydrogen or both. Depending upon the desired design and size, the means for fluid connection and disconnection can comprise a plurality of connectors on the housing, each functioning similarly to permit the controlled flow therethrough of either water, hydrogen or both. In one embodiment, the connection means comprises two sets of quick disconnect couplings, an example of which is described in U.S. Pat. No. 5,253,842 to Huebscher et al., although other quick disconnect configurations would also be effective in sealably and fluidly connecting the cartridge to either an electrolyzer or a fuel cell. One set of quick disconnect couplings would be configured to connect to corresponding quick disconnect couplings on the electrolyzer housing, while another set quick disconnect couplings would be configured to connect to corresponding quick disconnect couplings on the fuel cell housing.

Although the embodiments described herein configure the cartridge to be interchangeable with an electrolyzer and fuel cell at separate times, it is also contemplated that a housing would comprise opposing sets of quick disconnect couplings (e.g., on different sides of the cartridge housing) that would enable simultaneous connection of the cartridge to both the electrolyzer and the fuel cell, if so desired.

Figure 1:
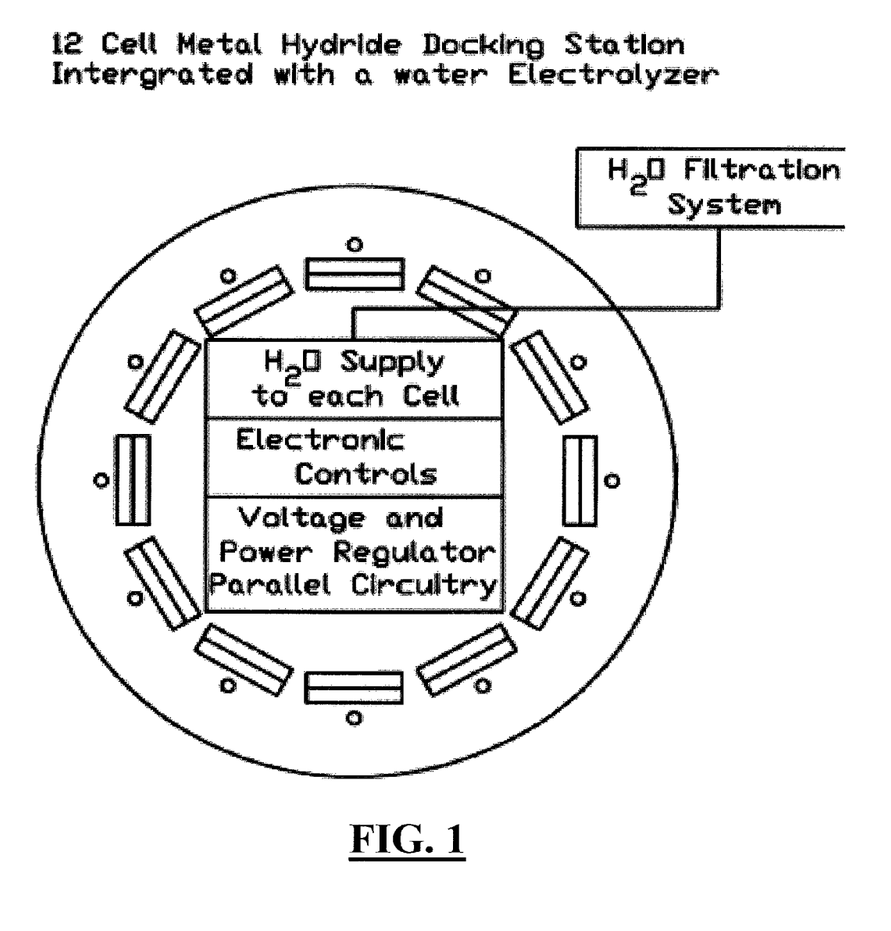
FIG. 1 is a schematic showing one embodiment of an arrangement of cartridge compartments and a charging station.
Figure 2:
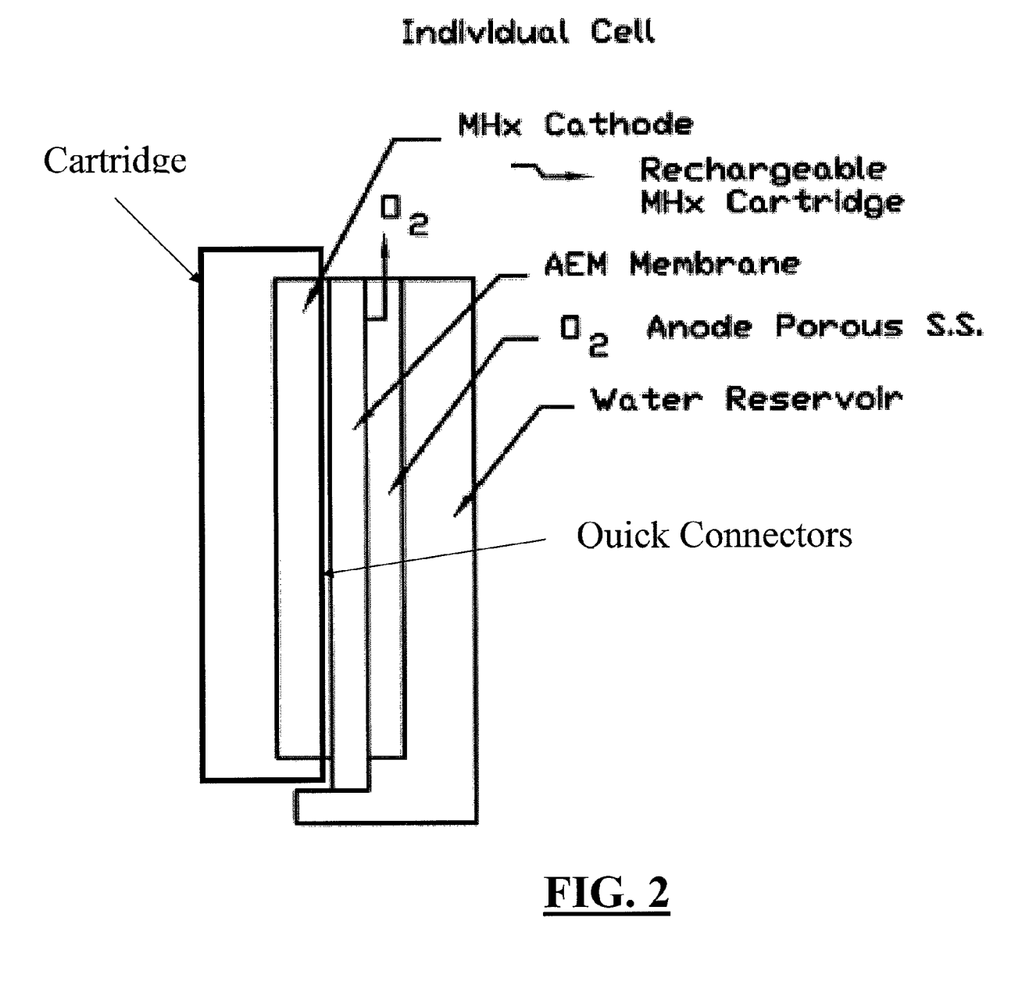
FIG. 2 is a schematic showing an electrolyzer comprising a metal hydride cathode that is configured to be housed within or without a cartridge housing for quick connection to portions of an electrolyzer to which the cathode functions.
Figure 3:
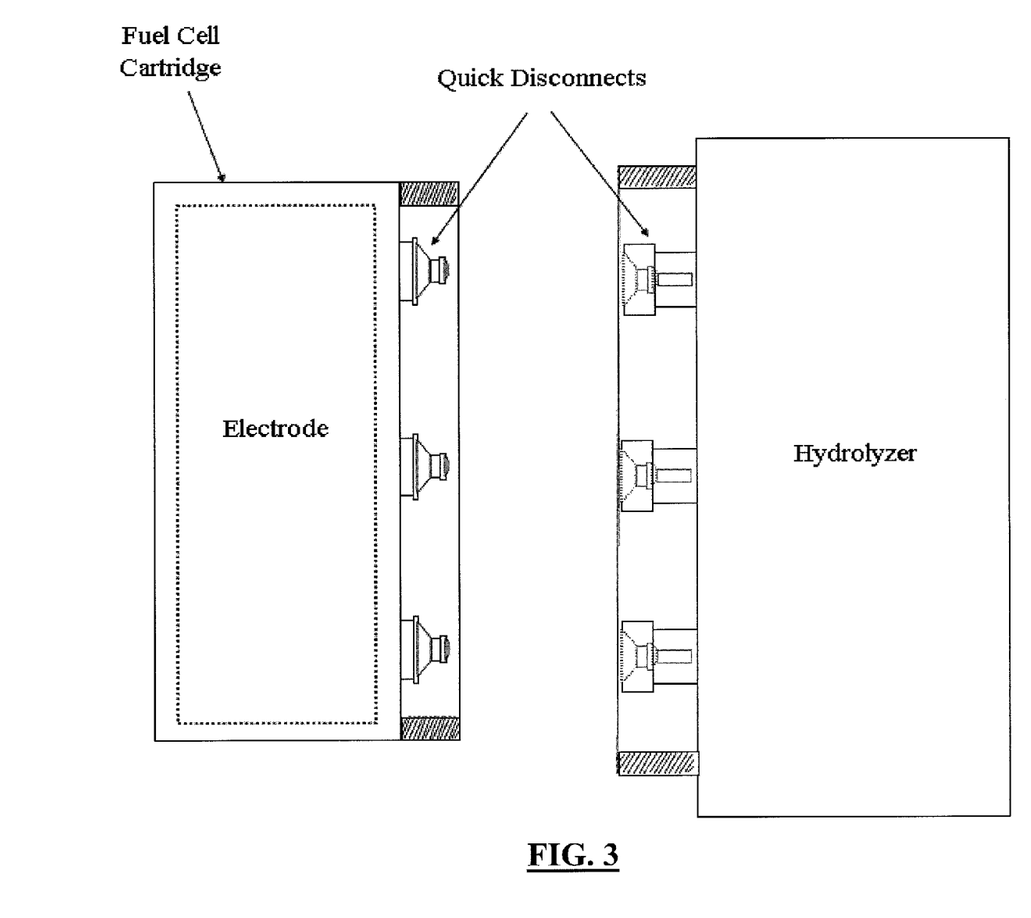
FIG. 3 is a schematic showing one embodiment of a system comprising a fuel cell cartridge with metal hydride cathode and mating electrolyzer housing.
Figure 4:
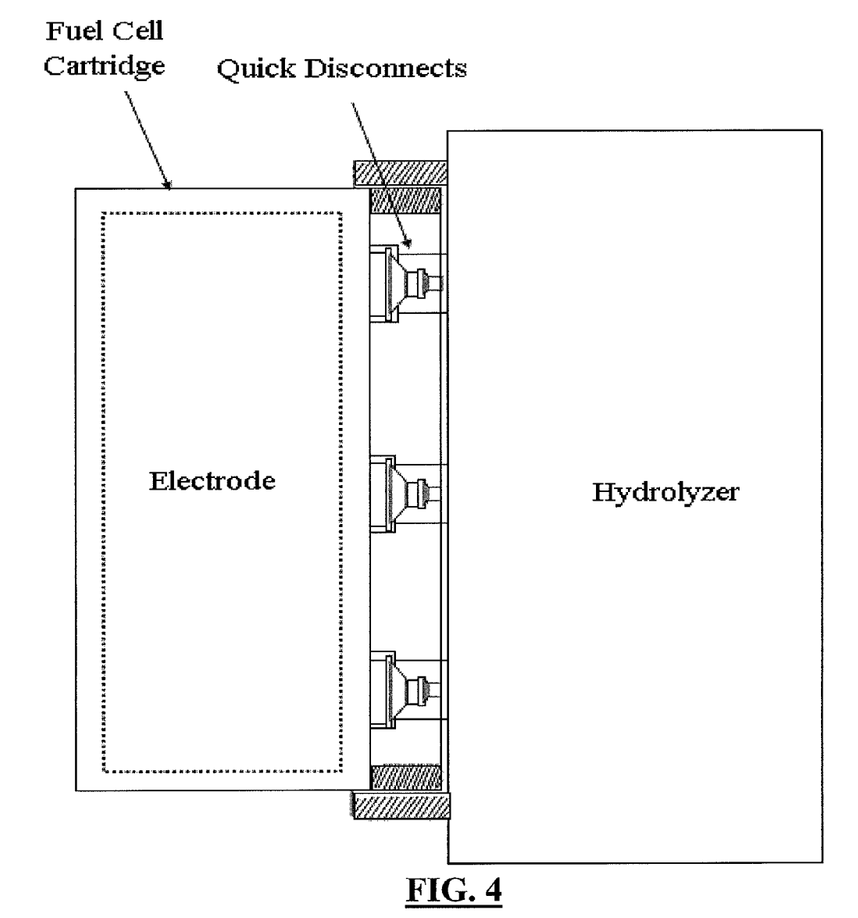
FIG. 4 is a schematic showing the system of FIG. 3 where the fuel cell cartridge with metal hydride cathode and mating electrolyzer housing are joined via a set of quick disconnect couplings.
Figure 5:
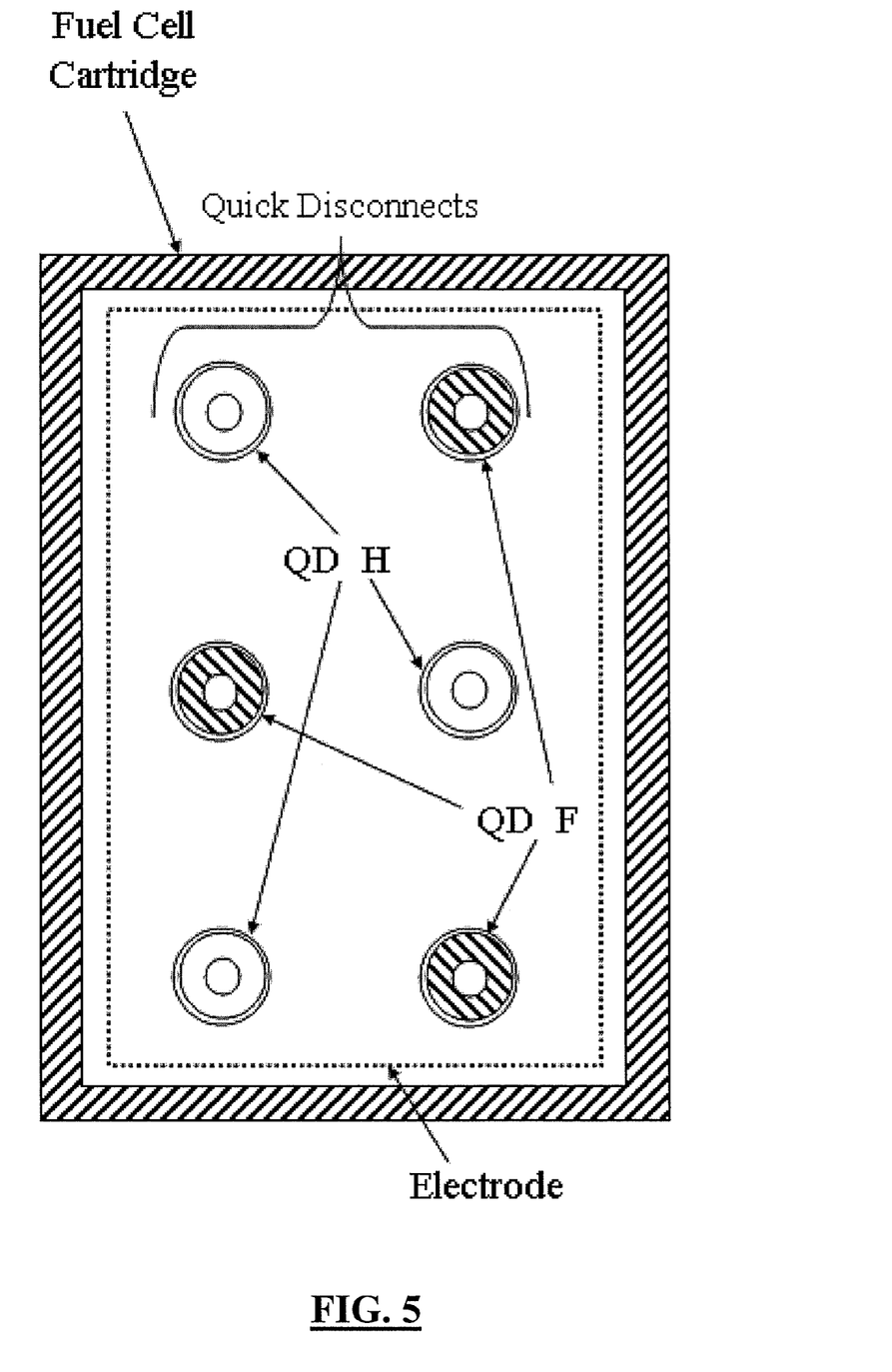
FIG. 5 is a schematic showing one face of the housing for the fuel cell cartridge of FIGS. 3 and 4 showing two sets of quick disconnect couplings, one set dedicated to fluid communication with a corresponding set of quick disconnect couplings on an electrolyzer ("QD H"), and another set dedicated to fluid communication with a corresponding set of quick disconnect couplings on a fuel cell ("QD F").
Figure 6:
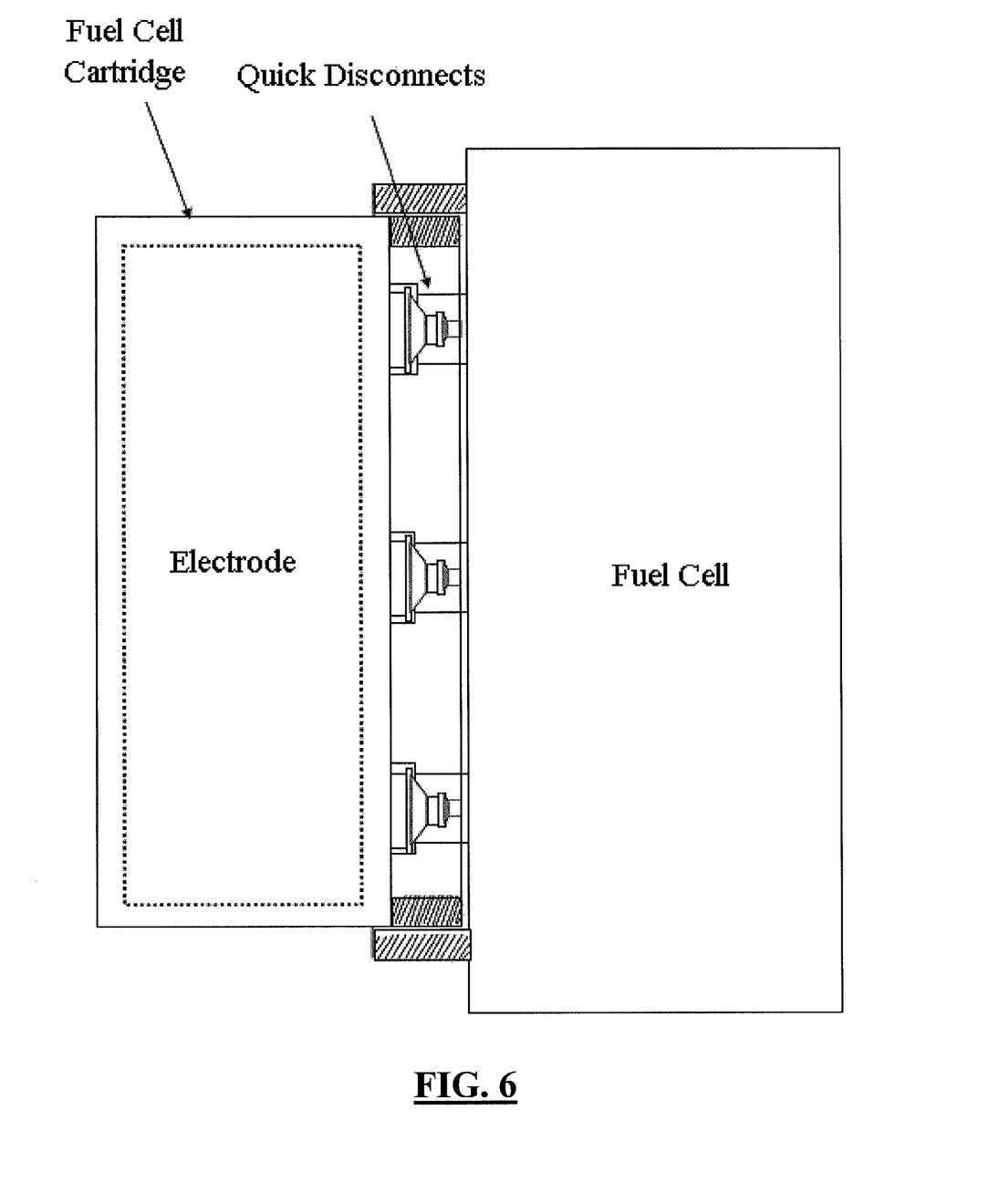
FIG. 6 is a schematic showing the fuel cell cartridge system of FIG. 5 where the cartridge and fuel cell are joined via a set of quick disconnect couplings.
Figure 7:
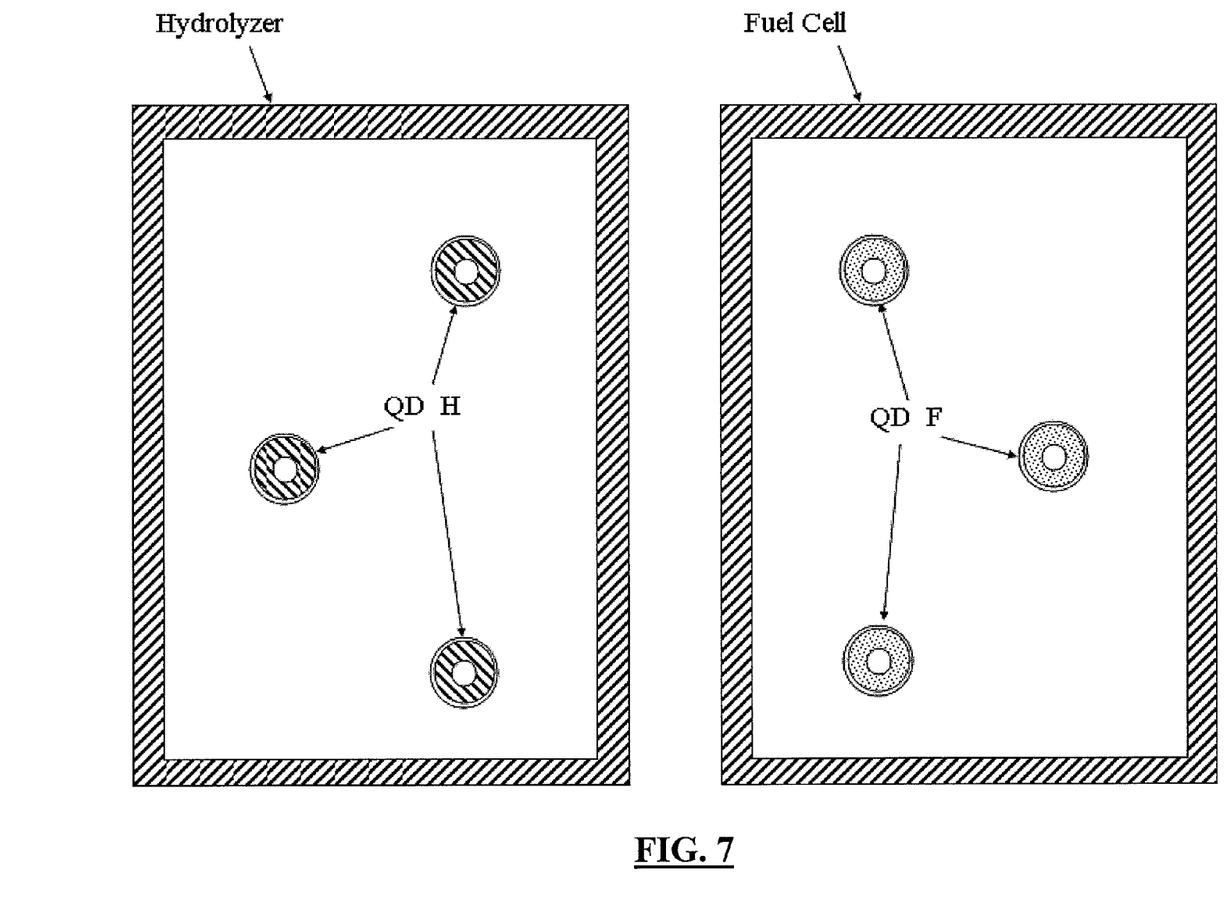
FIG. 7 is a schematic showing, on the left, a face of the electrolyzer housing with the corresponding set of quick disconnect couplings and, on the right, a face of the fuel cell housing with the corresponding set of quick disconnect couplings.

Referring to FIG. 1, it is contemplated that efficiency can be derived from providing a carousel arrangement of compartments for storing individual cartridges where charged cartridges can reside or can be moved to a charging station adjacent the carousel. For example, an arrangement of twelve compartments can be arranged in a generally circular configuration so that they can be moved to a charging station by rotating the carousel. One or more cartridges can be charged at a time, depending upon the number of adjacent charging stations provided. In one embodiment, the charging station comprises the portion of the electrolyzer to which the cartridge can be connected fluidly and electrically to electrolyze water.

EXAMPLE 1

Description of a Hydrogen Refueling System for Fuel Cells

Referring to FIG. 1, one example configuration has one or more of the following features: a Docking/recharging station, capable of simultaneously charging 12 cathode/metal hydride (MH) cartridges to 12 Whr each per day at the cathode of each of the electrolyzer cells, arranged in a circular array, with easy access to the MH cartridges for installation or removal; all individual electrolyzer cells in a parallel circuit to enable continuous operation of individual cells even when some cells have the MH cartridges removed after charging; MH cartridge port at cathode of each cell; smart sensors to assess completion of hydrogen charging and shut-off of power supply to cell; MH capable of electrochemical hydrogen charging with 3-5 wt % $H_2$ capacity and fast charging/discharging kinetics via addition of metal nanoparticles; Metal hydride system capable of direct hydrogen absorption from alkaline electrolyzer cathode to charge metal hydrides at operational pressure and low temperature; MH cartridge, capable of 150 cycles of charge/discharge per cartridge; MH cartridge, capable of hydrogen desorption to fuel cell at less than 150° C., and as close to ambient temperature as possible; Electrolyzer hydrogen production=100 standard liters per day in a 12-cell circular system, absorbed in situ into MH cartridges; 12-cell circular electrolyzer system, each cell with 8.40 $cm^2$ active area of electrode; system integration with water supply, process control electronics, voltage and current regulation for 12 parallel circuit cells, enabling individual cartridges to be removed upon completion of charging; oxygen venting to atmosphere or collection system.

What is claimed is:

1. An electrochemical cartridge comprising an electrode comprising reactive metal catalytic material within a housing, the cartridge configured to fluidly connect and disconnect to an electrolyzer in a manner that the electrode functions as the electrolyzer cathode, the cartridge further comprising hydrogen storage means and configured to connect and disconnect to a fuel cell for hydrogen exchange between the cartridge and the fuel cell.

2. The cartridge of claim 1, wherein the electrode comprises the hydrogen storage means.

3. The cartridge of claim 2, wherein the electrode comprises metal hydride.

4. The cartridge of claim 2, wherein the electrode comprises reactive nano-metal particles.

5. The cartridge of claim 1, wherein the housing comprises at least one connector for fluidly connecting and disconnecting the cartridge from either the electrolyzer or the fuel cell.

6. The cartridge of claim 5, wherein the housing comprises a plurality of connectors for fluidly connecting and disconnecting the cartridge from either the electrolyzer or the fuel cell.

7. The cartridge of claim 6, wherein the plurality of connectors are configured to permit simultaneous connection to both an electrolyzer and a fuel cell.

8. A system of generating chemical energy for use in a fuel cell, the system comprising the cartridge of claim 1 and an electrolyzer housing comprising an anode and a supply of electrolyte to which the cartridge may be sealably connected.

9. The system of claim 8, further comprising an array of compartments each configured to support a cartridge such that a single cartridge may be replenished with a supply of hydrogen by fluidly connecting to the electrolyzer housing.

10. The system of claim 9, wherein a plurality of cartridges may be replenished at the same time.

11. A system of powering a fuel cell, the system comprising the cartridge of claim 1, a fuel cell to which the cartridge may be sealably connected, and an electrolyzer housing comprising an anode and a supply of electrolyte to which the cartridge may be sealably connected.

* * * * *